United States Patent Office 3,147,240
Patented Sept. 1, 1964

3,147,240
THREE-COMPONENT ALKYL ALUMINUM HA-
LIDE CATALYSTS FOR OLEFIN POLYMERI-
ZATION AND OLEFIN POLYMERIZATION
PROCESS THEREWITH
Harry W. Coover, Jr., and Frederick B. Joyner, Kingsport,
Tenn., assignors to Eastman Kodak Company, Roch-
ester, N.Y., a corporation of New Jersey
No Drawing. Filed Oct. 17, 1960, Ser. No. 62,842
18 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins using a particular catalyst combination which has unexpected catalytic activity and which gives products characterized by unusually high crystallinity, softening point, thermal stability, stiffness and being substantially free of non-crystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Certain of the trialkyl aluminum compounds have been used in conjunction with inorganic halides to give high molecular weight polyethylene. Thus, triethyl aluminum in conjunction with titanium tetrachloride permits a low temperature, low pressure polymerization of ethylene to highly crystalline product. When this catalyst mixture is employed to polymerize propylene, the product is predominantly polymeric oils and rubbers with a comparatively small amount of high molecular weight crystalline product. Furthermore, a mixture of ethyl aluminum sesquihalide and titanium trihalide is ineffective as a polymerization catalyst, for example, for polymerizing propylene.

Some of the catalysts that are effective for producing crystalline high density polyethylene cannot be used to produce a similar type of polypropylene. Thus, one cannot predict whether a specific catalyst combination will be effective to produce crystalline high density polymers with specific α-olefins.

This invention is concerned with and has for an object the provision of improved processes whereby α-monoolefins and particularly propylene can be readily polymerized by catalytic means to give high molecular weight, highly crystalline polymers. A particular object of this invention is to provide a catalyst combination which has unexpected catalytic activity for the polymerization of α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing an aluminum sesquihalide having the formula $R_3Al_2X_3$ wherein R is a hydrocarbon radical containing 1–12 carbon atoms and selected from the group consisting of alkyl, aryl and aralkyl and X is a halide selected from the group consisting of chlorine, bromine and iodine, a compound of a transition metal selected from the group consisting of titanium, zirconium, vanadium, chromium and molybdenum, said compound being selected from the group consisting of halids, alkoxides, alkoxyhalides and acetylacetonates, and an amide as a third component. The amide can have the structural formula $$R_1-\overset{O}{\overset{\|}{C}}-N\diagup^{R_2}_{\diagdown R_3}$$

wherein $R_1$ is a radical selected from the group consisting of hydrogen, alkyl radicals containing from 1 to 20 carbon atoms, phenyl, carboxyl, alkoxy, $-N(R)_2$ wherein R is an alkyl radical containing 1 to 4 carbon atoms, and $$-(CH_2)_n\overset{O}{\overset{\|}{C}}N\diagup^{R_2}_{\diagdown R_3}$$

wherein $n$ is an integer of 1 to 4, and each of $R_2$ and $R_3$ is a radical selected from the group consisting of hydrogen, alkyl radicals containing 1 to 8 carbon atoms, phenyl and cyclohexyl.

The amide third component of the catalyst can have the structural formula $$\overset{O}{\overset{\|}{C}}\underset{\llcorner_{(CH_2)_n}\lrcorner}{-N-}\overset{H}{\underset{}{\mid}}\overset{O}{\overset{\|}{C}}$$

$$(CH_2)\diagup^{N-\overset{O}{\overset{\|}{C}}-R_4}_{\diagdown O\diagup}(CH_2)_n$$

and $$(CH_2)_n\diagup^{N-\overset{O}{\overset{\|}{C}}-R_4}_{\diagdown N-\underset{\|}{C}-R_4}(CH_2)_n$$
$$\phantom{xxxxxxxxx}O$$

wherein $n$ is an integer of 1 to 4 and $R_4$ is a radical selected from the group consisting of alkyl radicals containing 1 to 4 carbon atoms and phenyl.

Other third components that can be employed in the catalyst are phosphorus-containing amides having the structural formulas:

$$P(NR_5R_6)_x(OR_7)_y$$

and $$\overset{O}{\overset{\|}{P}}(NR_5R_6)_{x_1}(OR_7)_{y_1}$$

wherein $x$ and $y$ are whole numbers from 1 to 3 and 0 to 2 respectively, the sum of $x$ and $y$ being 3, and $x_1$ and $y_1$ are whole numbers from 1 to 2, the sum of $x_1$ and $y_1$ being 3, and $R_5$, $R_6$ and $R_7$ are alkyl radicals containing 1 to 8 carbon atoms.

Amide third components that can be used in the catalyst system are N,N-dimethylformamide, N,N-dimethylacetamide, N,N-diethylacetamide, N-cyclohexylacetamide, N-t-butylbenzamide, N-methyl-N-phenylacetamide, N-benzylacetamide, n-heptamide, palmitamide, stearanilide, acetanilide, isobutyramide, N,N'-di-t-butylurea, tetramethylurea, succinimide, N,N,N',N'-tetramethyladipamide, N-methylisobutyramide, N-benzoylmorpholine, N,N'-diacetylpiperazine, n-butyloxamate, ethyloxanilate, ethyl carbamate, diethyl N-dimethylamidophosphate, ethyl N,N-tetraethyl amidophosphate, diethyl N-dimethyl amidophosphite, ethyl N,N-tetraethyl diamidophosphite, N,N,N-hexaethyl triamidophosphite, dibutyl N-dipropyl amidophosphate, n-pentyl N,N-tetrabutyl amidophosphate, dipropyl N-dioctyl amidophosphite, n-hexyl N,N-tetrabutyl diamidophosphite, N,N,N-hexa(n-hexyl)triamidophosphite.

Catalyst mixtures that can be employed in practicing our invention are:

(a) Ethyl aluminum sesquichloride, titanium trichloride and N-cyclohexylacetamide.
(b) n-Octyl aluminum sesquibromide, titanium tetraethoxide and N-methyl-N-phenylacetamide.
(c) n-Decyl aluminum sesquiiodide, zirconium tetrabutoxide and palmitamide.
(d) n-Butyl aluminum sesquichloride, zirconium tetrachloride and acetanilide.
(e) Ethyl aluminum sesquichloride, vanadium-triethoxide and isobutyramide.
(f) Phenyl aluminum sesquibromide, molybdenum pentachloride and N,N'-di-t-butylurea.
(g) n-Hexyl aluminum sesquichloride, titanium tetrachloride and ethyl carbamate.
(h) Ethyl aluminum sesquichloride, titanium trichloride and ethyl N,N-tetraethyl amidophosphate.
(i) Phenyl aluminum sesquiiodide, vanadium trichloride and dimethyl N-dimethyl amidophosphate.
(j) Tolyl aluminum sesquibromide, titanium trichloride and N,N,N-hexamethyl triamidophosphite.
(k) Ethyl aluminum sesquichloride, titanium tetrachloride and dimethyl N-dimethyl amidophosphate.

The catalytic activity of this mixture was wholly unexpected, particularly since the alkyl aluminum sesquihalides and transition element compounds have not been known to possess catalytic activity for the polymerization of propylene and higher olefins to crystalline polymers and the third component is not a known polymerization catalyst. The inventive process is carried out in liquid phase in an inert organic liquid and preferably an inert liquid hydrocarbon vehicle. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressure of the order of 20,000 p.s.i. or higher. A particular advantage of the invention is that pressures of the order of 30 to 1000 p.s.i. give excellent results, and it is not necessary to employ high pressures which were necessary heretofore. The liquid vehicle employed is desirably one which serves as a liquid reaction medium and as a solvent for the solid polymerization products at the temperature of polymerization.

The invention is of particular importance in the preparation of highly crystalline polyethylene, polypropylene, the polybutenes and polystyrene although it can be used for polymerizing mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures, but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard ASTM method may be varied from about 0.1 to 100 or even higher.

The novel catalysts described above are particularly useful for polymerizing propylene to form a crystalline, high-density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidiy. Fibers of high strength can be spun from the molten polyolefins obtained according to this process.

As has been indicated above, the improved results obtained in accordance with this invention depend upon the particular cataylst combination. Thus, one of the components of the catalyst is a compound of aluminum sesquihalide having formula $R_3Al_2X_3$ wherein R is a hydrocarbon radical containing 1 to 12 carbon atoms and selected from the group consisting of alkyl, aryl and aralkyl. Among these hydrocarbon radicals are methyl, ethyl, propyl, butyl, phenyl, phenylethyl, naphthyl and the like, and the halogen selected from the group consisting of chlorine, bromine and iodine. The preferred aluminum sesquihalides are the lower alkyl aluminum sesquihalides and the most preferred compound is ethyl aluminum sesquihaldie. Another component of the catalyst composition is a compound of a transition metal selected from the group consisting of titanium, zirconium, vanadium, chromium and molybdenum. In these compounds the transition metal can be at its maximum valence but it is possible to employ a compound of a transition metal having a reduced valence. Among the transition metal compounds that can be used are the halides, alkoxides, alkoxyhalides and acetylacetonates of the above-named transition metals. Such compounds as titanium tetrachloride, titanium trichloride, titanium dichloride, titanium ethoxide, titanium butoxide, dibutoxy titanium dichloride, diethoxy titanium dichloride and titanium acetylacetonate can be used in the catalyst combination. Similar compounds of zirconium, vanadium, chromium and molybdenum can also be used. For the most desirable results it is preferred to use a halide of titanium having either its maximum valency or a reduced valency and specifically it is preferred to employ either titanium tetrachloride or titanium trichloride in the catalyst composition. The third component of the catalyst composition is an amide as previously described.

The limiting factor in the temperature of the process appears to be the decomposition temperature of the catalyst. Ordinarily, temperatures from 50° C. to 150° C.

are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixtures in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations about 5–10% by weight in a solution are ordinarily less desirable because the polymer dissolved in the reaction medium results in a very viscous solution.

The preferred molar ratio of aluminum compound to transition metal compound can be varied within the range of 1:0.5 to 1:2, and the molar ratio of aluminum compound to the third component of the catalytic mixture can be varied within the range of 1:1 to 1:0.25, but it will be understood that higher and lower molar ratios are within the scope of this invention. A particularly effective catalyst contains one mole of transition metal compound and 0.5 mole of the third component per mole of aluminum compound. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquid are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing ethylene, propylene, styrene and other $\alpha$-monoolefins in accordance with this invention is a mixture of ethyl aluminum sesquichloride, titanium trichloride and N,N-dimethylformamide or N,N-dimethylacetamide. The importance of the various components of this reaction mixture is evident from the fact that a mixture of ethyl aluminum sesquichloride and titanium trichloride is ineffective for polymerizing propylene. However, when the above amides or other third components within the scope of this invention are added to the mixture the resulting catalyst composition is highly effective for polymerizing propylene to form a highly crystalline high-density polymer.

The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with a polymerizable alphamonoolefin.

Similarly, a catalyst mixture containing ethyl aluminum sesquibromide and titanium tetrachloride can be used to polymerize propylene but the polymer formed contains mainly dimers, trimers and tetramers of propylene. When the polymerization is carried out using a similar catalyst to which the above amide or other third compound within the scope of this invention has been added the product is a highly crystalline polymer of high density and high softening point.

The invention is illustrated by the following examples of certain preferred embodiments thereof.

*Example 1*

Inside a nitrogen-filled dry box the following materials were placed into a dry 500-ml. pressure bottle: 100 ml. of dry heptane, 3 g. of the catalyst mixture which comprised a 2:3:1 molar ratio respectively of ethylaluminum sesquichloride, titanium trichloride, and N,N-dimethylformamide. The pressure bottle was sealed, removed from the dry box, attached to a Parr hydrogenation apparatus in which propylene had been admitted to the reservoir in place of hydrogen. Shaking was initiated and the pressure bottle and its contents were heated to 70° C. under 30 p.s.i. propylene pressure and maintained under these conditions for a total of 6 hours. The reaction bottle was disconnected from the shaking apparatus and dry methanol was added to the mixture to destroy the catalyst. The crude polymer was washed in refluxing isobutanol to thoroughly remove all catalyst and after several washes followed by an additional methanol wash and finally a water wash, a total of 13.0 g. of highly crystalline polypropylene was obtained having an inherent viscosity of 3.05.

When a control experiment was run using ethylaluminum sesquichloride and titanium trichloride with no N,N-dimethylformamide present, the 3-g. catalyst mixture gave little or no solid polypropylene under the above conditions.

*Example 2*

Inside a nitrogen-filled dry box, the following materials were placed into a 285 ml. stainless steel autoclave: 100 ml. of dry mineral spirits (B.P. 197° C.), a total of 1 g. of a 1:2:1 molar ratio of ethylaluminum sesquichloride, titanium trichloride and N,N-dimethylacetamide. The autoclave was sealed, then attached to a rocker where dry liquid propylene was fed into the autoclave until 100 ml. had been added. The autoclave was sealed, rocking was initiated, and the mixture was heated to 85° C. and maintained there for a period of 6 hours. The polymer was worked up as described in Example 1. A yield of 43.0 g. of highly crystalline polypropylene having an inherent viscosity of 2.87 was obtained.

*Example 3*

The procedure of Example 2 was employed using 200 ml. of liquid propylene with no mineral spirit solvent, and a total of 1 g. of the three-component catalyst mixture which comprised a 2:4:0.5 molar ratio of ethylaluminum sesquibromide to titanium trichloride to N,N,N',N'-tetramethyladipamide. The polymerization was run at 85° C. for 6 hours whereupon the yield of highly crystalline polypropylene was 95.0 g., having an inherent viscosity of 3.5. Similar results were obtained by using palmitamide, N-benzylacetamide or N-t-butylbenzamide in place of the N,N,N',N'-tetramethyladipamide.

*Example 4*

The procedure of Example 2 was employed using a catalyst mixture totaling 1 g. in quantity and comprising a 1:2:1 molar ratio of ethylaluminum sesquichloride to vanadium trichloride to tetramethylurea and using 50 g. of 3-methyl-1-butene as the monomer. A yield of 37.0 g. of highly crystalline poly-3-methyl-1-butene was obtained at a polymerization temperature of 150° C. for a period of 6 hours. The inherent viscosity of the product was 2.3.

*Example 5*

The procedure of Example 2 was followed using 1 g. of total catalyst comprising a 2:3:1 molar ratio of cyclohexyl aluminum sesquichloride to vanadium trichloride to butyl oxamate. The polymerization was carried out at 75° C. for 6 hours and from a charge of 50 g. of styrene monomer, 40.0 g. of highly crystalline polystyrene was obtained, having an inherent viscosity of 2.75.

*Example 6*

The procedure of Example 2 was followed using allylbenzene as the monomer with a 2:1:1 molar ratio of phenyl aluminum sesquichloride to molybdenum pentachloride to N-benzoylmorpholine. At a polymerization temperature of 125° C. for 6 hours, a charge of 50 g. of allylbenzene monomer was converted to 35.5 g. of poly(allylbenzene) which was highly crystalline and had an inherent viscosity of 1.35.

*Example 7*

The procedure of Example 2 was following using a 2:3:1 molar ratio of tolyl aluminum sesquinchloride, zirconium tetrachloride, and N,N-diacetylpiperazine with a 50-g. charge of vinylcyclohexane monomer and a polymerization temperature of 150° C. A 30.0 g. yield of highly crystalline poly(vinylcyclohexane) was obtained, having an inherent viscosity of 1.45.

*Example 8*

The procedure of Example 2 was followed using a 50 g. charge of butadiene monomer and a polymerization temperature of 60° C. for 4 hours. The yield of polybutadiene was 37.5 g., having an inherent viscosity of 1.55.

*Example 9*

The procedure of Example 2 was followed except that the catalyst charge was 1 g. of a mixture of ethylaluminum sesquichloride, titanium trichloride and stearanilide in a molar ratio of 1:1:0.5. No solvent was employed and the polymerization temperature was 85° C. The crystalline polypropylene obtained had a density of 0.918 and an inherent viscosity of 3.1.

Other amides which can be used to give similar results include diethyl N-dimethylamidophosphate, ethyl N,N-tetraethylamidophosphate, ethyl N,N-tetraethyldiamidophosphite, and N,N,N-hexaethyltriamidophosphite.

Thus, by means of this invention polyolefins such as polyethylene and polypropylene are readily produced using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments and the like, or mixed with other polymeric materials, waxes and the like. In general, aside from the relatively higher values for such properties as softening point, density, stiffness, and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is posisble to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also, polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to the polypropylene prepared in accordance with this invention thus characterized and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be prepared from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

This application is a continuation-in-part of our copending application Serial No. 724,910, filed March 31, 1958, and now Patent No. 2,956,991.

We claim:

1. In the polymerization of alpha-monoolefinic hydrocarbon material to form solid crystalline polymer the improvement which comprises catalyzing the polymerization with a catalytic mixture containing an aluminum sesquihalide having the formula $R_3Al_2X_3$ wherein R is a hydrocarbon radical containing 1 to 12 carbon atoms selected from the group consisting of alkyl, aryl and aralkyl and X is a halogen atom selected from the group consisting of chlorine, bromine and iodine, a compound of a transition metal selected from the group consisting of titanium, vanadium, zirconium, chromium and molybdenum and a third component selected from the amides having the formulas:

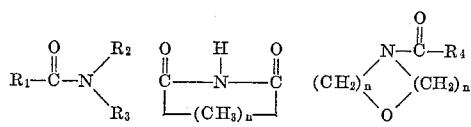

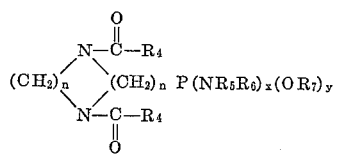

and

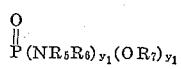

wherein $R_1$ is a radical selected from the group consisting of hydrogen, alkyl radicals containing 1 to 20 carbon atoms, phenyl, carboxyl, alkoxy, —N(R)₂ wherein R is an alkyl radical containing 1 to 4 carbon atoms and

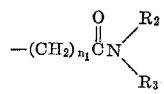

wherein $n_1$ is an integer of 1 to 4, each of $R_2$ and $R_3$ is a radical selected from the group consisting of hydrogen, alkyl radicals containing 1 to 8 carbon atoms, phenyl and cyclohexyl, and wherein $R_4$ is a radical selected from the group consisting of alkyl radicals containing 1 to 4 carbon atoms and phenyl and $n$ is an integer of 1 to 4, and wherein $R_5$, $R_6$ and $R_7$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ are whole numbers from 1 to 2, the sum of $x_1$ and $y_1$ being 3.

2. In the polymerization of at least one monoolefin from the group consisting of ethylene and propylene to form solid crystalline polymer the improvement which comprises effecting the polymerization in the presence of a catalytic mixture of a lower alkyl aluminum sesquihalide, a titanium halide and a third component selected from the amides having the formula:

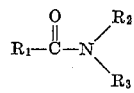

wherein $R_1$ is a radical selected from the group consisting of hydrogen, alkyl radicals containing 1 to 20 carbon atoms, phenyl, carboxyl, alkoxy, —N(R)₂ wherein R is an alkyl radical containing 1 to 4 carbon atoms and

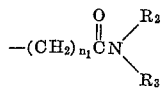

wherein $n_1$ is an integer of 1 to 4, and each of $R_2$ and $R_3$ is a radical selected from the group consisting of hydrogen, alkyl radicals containing 1 to 8 carbon atoms, phenyl and cyclohexyl.

3. In the polymerization of at least one monoolefin from the group consisting of ethylene and propylene to form solid crystalline polymer the improvement which comprises effecting the polymerization in the presence of a catalytic mixture of a lower alkyl aluminum sesquihalide, a titanium halide and a third component selected from the amides having the formula $P(NR_5R_6)_x(OR_7)_y$ wherein $R_5$, $R_6$ and $R_7$ are alkyl radicals containing 1 to 8 carbon atoms, and $x$ and $y$ are whole numbers from 1 to 3 and 0 to 2, respectively, the sum of $x$ and $y$ being 3.

4. In the polymerization of at least one monoolefin from the group consisting of ethylene and propylene to form solid crystalline polymer the improvement which comprises effecting the polymerization in the presence of a catalytic mixture of a lower alkyl aluminum sesquihalide, a titanium halide and a third component selected from the amides having the formula:

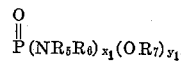

wherein $R_5$, $R_6$ and $R_7$ are alkyl radicals containing 1 to 8 carbon atoms, and $x_1$ and $y_1$ are whole numbers from 1 to 2, the sum of $x_1$ and $y_1$ being 3.

5. In the polymerization of propylene to form solid crystalline polymer the improvement which comprises effecting the polymerization in liquid dispersion in an organic liquid and in the presence of a catalytic mixture having a molar ratio of ethyl aluminum sesquichloride and titanium trichloride of 1:0.5 to 1:2 and a molar ratio of ethyl aluminum sesquichloride and N,N-dimethylformamide within the range of 1:1 to 1:0.25.

6. The method according to claim 5 wherein vanadium trichloride is used in the catalyst mixture in place of titanium trichloride.

7. The method according to claim 5 wherein N,N-dimethylacetamide is used in the catalyst mixture in place of N,N-dimethylformamide.

8. In the polymerization of propylene to form solid crystalline polymer the improvement which comprises effecting the polymerization in liquid dispersion in an inert organic liquid and in the presence of a catalytic mixture having a molar ratio of ethyl aluminum sesquichloride and titanium tetrachloride within the range of 1:0.5 to 1:2 and a molar ratio of ethyl aluminum sesquichloride to N,N,N',N'-tetramethyladipamide within the range of 1:1 to 1:0.25.

9. In the polymerization of propylene to form solid crystalline polymer the improvement which comprises effecting the polymerization in liquid dispersion in an inert liquid hydrocarbon vehicle and in the presence of a catalytic mixture having a molar ratio of ethyl aluminum sesquichloride and titanium tetrachloride of 1:0.5 to 1:2 and a molar ratio of ethyl aluminum sesquichloride and ethyl N,N-tetraethyl amidophosphate within the range of 1:1 to 1:0.25.

10. As a composition of matter, a polymerization catalyst containing an aluminum sesquihalide having the formula $R_3Al_2X_3$ wherein R is a hydrocarbon radical containing 1 to 12 carbon atoms selected from the group consisting of alkyl, aryl and aralkyl and X is a halogen atom selected from the group consisting of chlorine, bromine and iodine, a compound of a transition metal selected from the group consisting of titanium, vanadium, zirconium, chromium and molybdenum and a third component selected from the amides having the formulas:

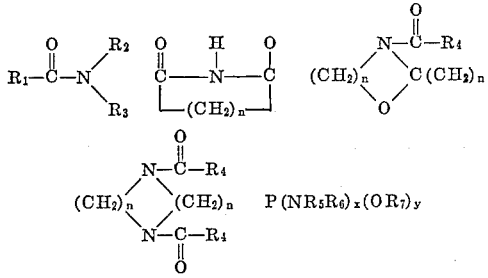

and

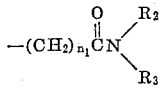

wherein $R_1$ is a radical selected from the group consisting of hydrogen, alkyl radicals containing 1 to 20 carbon atoms, phenyl, carboxyl, alkoxy, —$N(R)_2$ wherein R is an alkyl radical containing 1 to 4 carbon atoms and

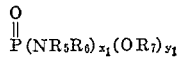

wherein $n_1$ is an integer of 1 to 4, each of $R_2$ and $R_3$ is a radical selected from the group consisting of hydrogen, alkyl radicals containing 1 to 8 carbon atoms, phenyl and cyclohexyl, and wherein $R_4$ is a radical selected from the group consisting of alkyl radicals containing 1 to 4 carbon atoms and phenyl and $n$ is an integer of 1 to 4, and wherein $R_5$, $R_6$ and $R_7$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ are whole numbers from 1 to 2, the sum of $x_1$ and $y_1$ being 3.

11. As a composition of matter, a polymerization catalyst containing a lower alkyl aluminum sesquihalide, a titanium halide and a third component selected from the amides having the formula:

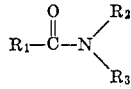

wherein $R_1$ is a radical selected from the group consisting of hydrogen, alkyl radicals containing 1 to 20 carbon atoms, phenyl, carboxyl, alkoxy, —$N(R)_2$ wherein R is an alkyl radical containing 1 to 4 carbon atoms and

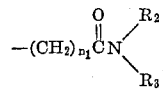

wherein $n_1$ is an integer of 1 to 4, and each of $R_2$ and $R_3$ is a radical selected from the group consisting of hydrogen, alkyl radicals containing 1 to 8 carbon atoms, phenyl and cyclohexyl.

12. As a composition of matter, a polymerization catalyst containing a lower alkyl aluminum sesquihalide, a titanium halide and a third component selected from the amides having the formula $P(NR_5R_6)_x(OR_7)_y$ wherein $R_5$, $R_6$ and $R_7$ are alkyl radicals containing 1 to 8 carbon atoms, and $x$ and $y$ are whole numbers from 1 to 3 and 0 to 2, respectively, the sum of $x$ and $y$ being 3.

13. As a composition of matter, a polymerization catalyst containing a lower alkyl aluminum sesquihalide, a titanium halide and a third component selected from the amides having the formula:

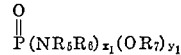

wherein $R_5$, $R_6$ and $R_7$ are alkyl radicals containing 1 to 8 carbon atoms, and $x_1$ and $y_1$ are whole numbers from 1 to 2, the sum of $x_1$ and $y_1$ being 3.

14. As a composition of matter, a polymerization catalyst containing a molar ratio of ethyl aluminum sesquichloride and titanium trichloride of 1:0.5 to 1:2 and a molar ratio of ethyl aluminum sesquichloride and N,N-dimethylformamide within the range of 1:1 to 1:0.25.

15. A composition according to claim 14 wherein vanadium trichloride is used in place of titanium trichloride.

16. A composition according to claim 14 wherein N,N-dimethylacetamide is used in place of N,N-dimethylformamide.

17. As a composition of matter, a polymerization catalyst containing a molar ratio of ethyl aluminum sesquichloride and titanium tetrachloride within the range of 1:0.5 to 1:2 and a molar ratio of ethyl aluminum sesquichloride to N,N,N',N'-tetramethyladipamide within the range of 1:1 to 1:0.25.

18. As a composition of matter, a polymerization catalyst containing a molar ratio of ethyl aluinum sequichloride and titanium tetrachloride of 1:0.5 to 1:2 and a molar ratio of ethyl aluminum sesquichloride and ethyl N,N-tetraethyl amidophosphate within the range of 1:1 to 1:0.25.

References Cited in the file of this patent

UNITED STATES PATENTS

| | | |
|---|---|---|
| 2,886,561 | Reynolds et al. | May 12, 1959 |
| 2,932,633 | Juveland et al. | Apr. 12, 1960 |
| 2,956,991 | Coover et al. | Oct. 18, 1960 |
| 3,018,278 | Shearer et al. | Jan. 23, 1962 |

FOREIGN PATENTS

| | | |
|---|---|---|
| 809,717 | Great Britain | Mar. 4, 1959 |
| 534,792 | Belgium | Jan. 31, 1955 |
| 554,242 | Belgium | May 16, 1957 |

UNITED STATES PATENT OFFICE
CERTIFICATE OF CORRECTION

Patent No. 3,147,240

September 1, 1964

Harry W. Coover, Jr., et al.

It is hereby certified that error appears in the above numbered patent requiring correction and that the said Letters Patent should read as corrected below.

Column 9, lines 47 to 50, the formula should appear as shown below instead of as in the patent:

$$\overset{\overset{O}{\|}}{P}(NR_5R_6)_{x_1}(OR_7)_{y_1}$$

Signed and sealed this 9th day of March 1965.

(SEAL)
Attest:

ERNEST W. SWIDER
Attesting Officer

EDWARD J. BRENNER
Commissioner of Patents